United States Patent
Jenkins

(10) Patent No.: US 7,976,740 B2
(45) Date of Patent: Jul. 12, 2011

(54) FABRICATION OF OPTICALLY SMOOTH LIGHT GUIDE

(75) Inventor: Kurt Allen Jenkins, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/335,551

(22) Filed: Dec. 16, 2008

(65) Prior Publication Data

US 2010/0148384 A1 Jun. 17, 2010

(51) Int. Cl.
*B29D 11/00* (2006.01)
*G02B 6/10* (2006.01)

(52) U.S. Cl. ..... 264/1.29; 264/2.7; 264/500; 264/177.1; 428/156; 362/623

(58) Field of Classification Search ............... 264/1.24, 264/1.29, 2.7, 500, 146; 428/156; 362/623
See application file for complete search history.

(56) References Cited

U.S. PATENT DOCUMENTS

| | | | | |
|---|---|---|---|---|
| 4,284,591 A | * | 8/1981 | Neefe | 264/1.1 |
| 4,406,045 A | * | 9/1983 | Schwab | 29/527.2 |
| 4,838,634 A | * | 6/1989 | Bennion et al. | 385/132 |
| 4,865,413 A | * | 9/1989 | Hubner et al. | 385/71 |
| 5,114,658 A | | 5/1992 | Katsaros | |
| 5,372,758 A | * | 12/1994 | Lundstrom et al. | 264/1.25 |
| 5,815,621 A | * | 9/1998 | Sakai et al. | 385/80 |
| 5,840,352 A | * | 11/1998 | Shimizu et al. | 425/556 |
| 5,967,637 A | | 10/1999 | Ishikawa et al. | |
| 6,123,431 A | * | 9/2000 | Teragaki et al. | 362/625 |
| 6,218,184 B1 | * | 4/2001 | Hasegawa et al. | 435/431 |
| 6,241,919 B1 | | 6/2001 | Kuo | |
| 6,497,939 B1 | * | 12/2002 | Obuchi et al. | 428/156 |
| 6,699,409 B2 | * | 3/2004 | Choi et al. | 264/1.24 |
| 6,755,638 B2 | | 6/2004 | Chen et al. | |
| 6,776,931 B2 | * | 8/2004 | Nishigaki | 264/1.1 |
| 6,835,440 B1 | * | 12/2004 | Konishi et al. | 428/156 |
| 7,114,947 B2 | | 10/2006 | Sandstrom et al. | |
| 7,377,478 B2 | * | 5/2008 | Tahara et al. | 249/114.1 |
| 7,465,163 B2 | * | 12/2008 | Benson et al. | 425/471 |
| 2001/0045108 A1 | | 11/2001 | Steinberg et al. | |
| 2002/0160042 A1 | | 10/2002 | Petereit et al. | |
| 2003/0080450 A1 | * | 5/2003 | Taniguchi et al. | 264/2.5 |
| 2005/0189665 A1 | * | 9/2005 | Nishigaki | 264/1.1 |

(Continued)

FOREIGN PATENT DOCUMENTS

EP 0050227 B1 5/1984

(Continued)

OTHER PUBLICATIONS

D.B Min'kov et al. "Quartz ceramic made from thermoplastic suspension" UDC 666.762.2.022.846 p. 525-526.*

(Continued)

*Primary Examiner* — Joseph S Del Sole
*Assistant Examiner* — Nahida Sultana
(74) *Attorney, Agent, or Firm* — Alleman Hall McCoy Russell & Tuttle LLP

(57) ABSTRACT

Embodiments related to the fabrication of a light guide are provided. One disclosed embodiment comprises extruding a thermoplastic polymer through a die to form an extrusion, machining the extrusion to one or more fixed dimensions, and maintaining a face of the extrusion in contact with a heated mold surface to soften or melt the face of the extrusion while applying pressure to the extrusion.

16 Claims, 4 Drawing Sheets

U.S. PATENT DOCUMENTS

| | | | |
|---|---|---|---|
| 2005/0226574 A1* | 10/2005 | Walker et al. | 385/120 |
| 2005/0266112 A1 | 12/2005 | Che | |
| 2006/0133110 A1* | 6/2006 | Tahara et al. | 362/615 |
| 2008/0130286 A1 | 6/2008 | Hartter et al. | 362/268 |
| 2008/0150175 A1* | 6/2008 | Johnson | 264/1.29 |
| 2009/0161369 A1* | 6/2009 | Regev et al. | 362/311.01 |
| 2009/0185775 A1* | 7/2009 | Hodono | 385/14 |
| 2010/0041807 A1* | 2/2010 | Eiha et al. | 524/401 |
| 2010/0104855 A1* | 4/2010 | Yoshioka et al. | 428/323 |

FOREIGN PATENT DOCUMENTS

| | | | |
|---|---|---|---|
| JP | 08005804 A | * | 1/1996 |
| JP | 2002292687 A | * | 10/2002 |
| JP | 2004338363 | * | 12/2004 |
| JP | 2004338363 A | * | 12/2004 |
| KR | 1020070108510 A | | 11/2007 |
| WO | 03048635 A1 | | 6/2003 |
| WO | 03061937 A1 | | 7/2003 |
| WO | WO2008123590 A1 | * | 10/2008 |

OTHER PUBLICATIONS www.google.com/search for Mica, or float glass similar to Merriam webster dictionarypage 1.*

Travis, et al., "Manufacturing Requirements for High Quality Flat Projection Displays", Retrieved at <<http://www2.eng.cam.ac.uk/~arlt1/05%20Manufacturing%20requirements%20for%20high%20quality%20flat%20projection%20displays.pdf>>, IDMC 2005, pp. 229-232.

"International Search Report", Mailed Date: Jun. 29, 2010, Application No. PCT/US2009/067949, Filed Date: Dec. 14, 2009, pp. 10.

* cited by examiner

FABRICATION OF OPTICALLY SMOOTH LIGHT GUIDE

BACKGROUND

A display device may include a light guide that transmits an image to a display surface, focuses an image on a detector, or does both. For some applications, the light guide may be wedge-shaped, transparent in one or more visible, ultraviolet, and/or infrared wavelength ranges, and comprise at least one pair of opposing faces. Light may propagate through the light guide via internal reflection from the opposing faces and emerge from at least one face as a collimated image.

The quality of the image provided by the display device may depend on the roughness of the opposing faces of the light guide, where internal reflection takes place. For some applications, an average roughness of ±2 nanometers or less may be desired for superior image quality. Depending on the application, certain optical features—Fresnel lens features, for example—may also be provided in the light guide. A high degree of smoothness and dimensional fidelity may be desired for these features as well, and may be achieved using specialized optical materials and/or complex etching and polishing procedures. However, light guides made using such materials and procedures may be too expensive for many applications.

SUMMARY

Therefore, in one embodiment, a method for making a light guide is provided. The method comprises extruding a thermoplastic polymer through a die to form an extrusion, machining the extrusion to one or more fixed dimensions, and maintaining a face of the extrusion in contact with a heated mold surface to soften or melt the face of the extrusion while applying pressure to the extrusion.

It will be understood that the summary above is provided to introduce in simplified form a selection of concepts that are further described in the detailed description. It is not meant to identify key or essential features of the claimed subject matter, the scope of which is defined by the claims that follow the detailed description. Further, the claimed subject matter is not limited to implementations that solve any disadvantages noted above or in any part of this disclosure.

DETAILED DESCRIPTION

Figure 1:
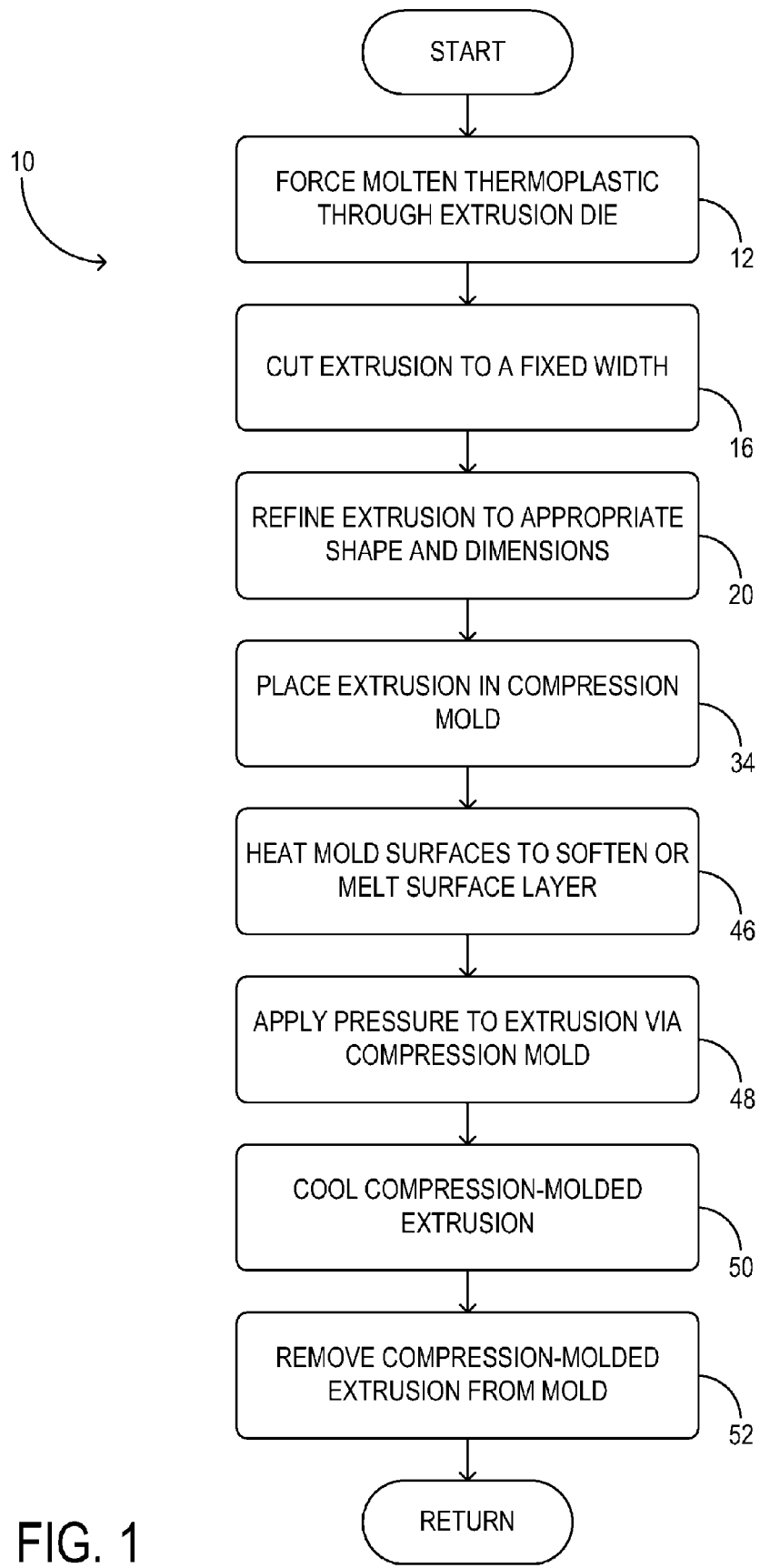
FIG. 1 illustrates an example embodiment of a method for making a light guide in accordance with the present disclosure.

FIG. 1 illustrates an example method 10 for making a light guide. The method begins at 12, where a molten, thermoplastic polymer or other thermoplastic material is forced through an extrusion die. The thermoplastic polymer may comprise a polyacrylate, a polyacrylonitrile, a polyamide, and/or a polycarbonate, for example. In some embodiments, the thermoplastic polymer may comprise a mixture of two or more such polymers. The thermoplastic material may be selected for transparency in one or more visible, ultraviolet, and/or infrared wavelength ranges. In embodiments where the light guide is to be used solely for displaying and/or collecting optical images, transparency over the visible range may be sufficient. However, some light guides may also be configured to project and/or collect infrared or ultraviolet light for object detection. In these embodiments, the thermoplastic polymer may be selected for transparency in various infrared and/or ultraviolet ranges as well.

Figure 2:
FIG. 2 shows an example embodiment of an extrusion die for making a light guide in accordance with the present disclosure.

FIG. 2 shows a cross-section of an example extrusion die 14 through which the molten thermoplastic polymer may be forced. The cross-section is quadrilateral in shape with example dimensions indicated in the drawing. Forcing the molten thermoplastic polymer through a die of this shape gives rise to a substantially wedge-shaped extrusion having a pair of opposing, nearly parallel faces and a quadrilateral cross-section. In other embodiments, the die may be shaped differently, thereby providing a differently shaped extrusion. For example, the extrusion die may be rectangular in shape and give rise to a sheet-like (i.e., rectangular prismatic) extrusion. It will be understood that these specific examples of extrusion shapes are presented for the purpose of example, and are not intended to be limited in any manner.

Figure 3:
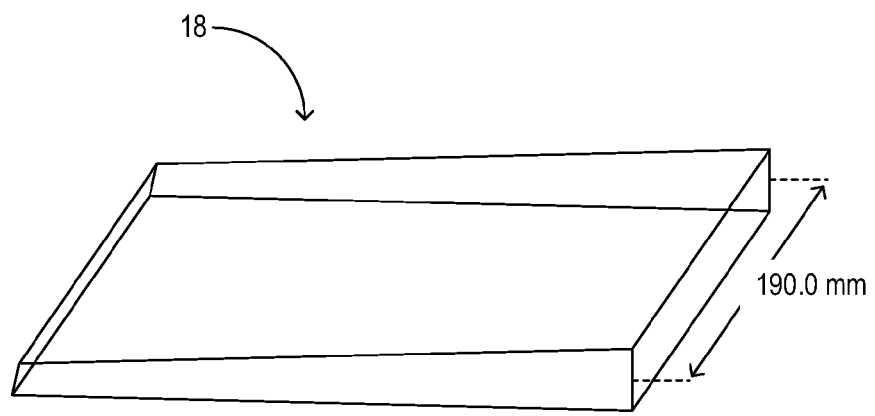
FIG. 3 shows an example embodiment of a cut extrusion from which a light guide is made, in accordance with the present disclosure.

Returning to FIG. 1, method 10 continues to 16, where the cooled extrusion is cut to one or more fixed dimensions, including but not limited to a fixed width. The extrusion may be cut by using a saw or a mill. FIG. 3 shows an example cut extrusion 18, which is cut to a fixed width, an example of which is indicated in the drawing. In other embodiments, the fixed width may be any desired width of the light guide, and may be chosen based on the dimensions of the display device in which the light guide is to be installed.

Returning again to FIG. 1, method 10 continues to 20, where the cut extrusion is refined to an appropriate shape and to appropriate dimensions for further processing. In some embodiments, the appropriate shape may be similar to the final shape of the light guide that is desired, and the appropriate dimensions may be the same as or slightly larger than the desired final dimensions. Refining the extrusion may comprise machining, cutting, milling, etching, and/or polishing, as examples. Etching may comprise wet or dry mechanical etching (e.g., sanding or filing) and/or chemical etching. Any etching process may be conducted with the aid of a mask (e.g., a photomask) to vary the etching depth in a controllable manner, to introduce surface features, etc.

Refining the extrusion at 20 may also comprise modifying a cross-section of the extrusion. Thus, in some embodiments, process step 12 may result in an extrusion having a cross-sectional shape that matches the cross-sectional shape of the final light guide, while in other embodiments, the extrusion may have a rectangular, sheet-like shape before refinement, and at 20, be refined to have a cross-sectional shape that matches the cross-sectional shape of the final light guide.

Figure 4:
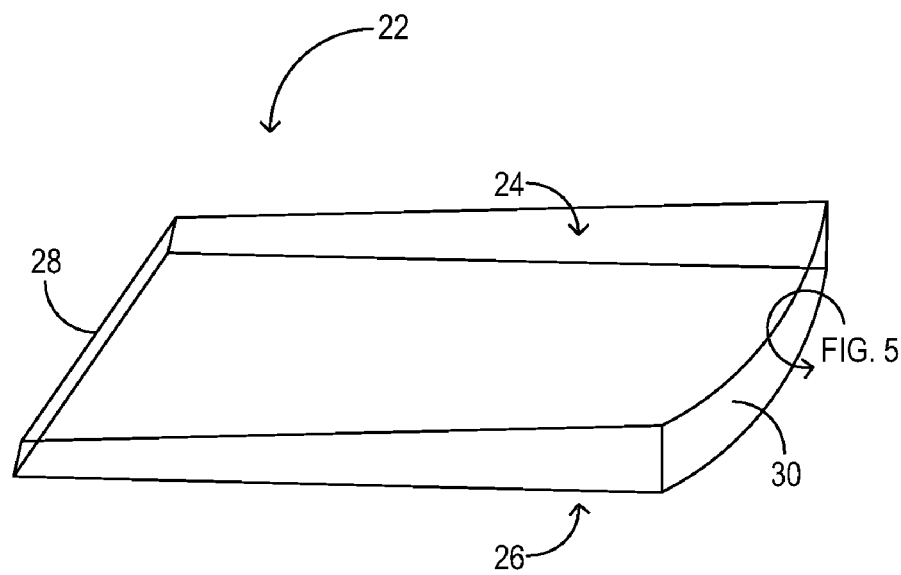
FIG. 4 shows an example embodiment of a refined extrusion from which a light guide is made, in accordance with the present disclosure.

FIG. 4 shows refined extrusion 22 which may be formed from cut extrusion 18 in the manner described above. The refined extrusion includes opposing faces 24 and 26, thinner side 28, and thicker side 30 opposite the thinner side. In this example, the refined extrusion is milled on the thicker side to define a section of a cylinder enclosed by an acute central angle. The radius of curvature of the section so defined may be determined based on a configuration of the display device in which the light guide is to be installed.

In some embodiments, one or more sides of the light guide (thinner side 28, thicker side 30, for example) may function as a lens, wherein radius of curvature defines a focal length of the lens. In particular, one or more sides of the light guide may be configured to collimate light from a point source exterior to the light guide—a projector, for instance—or to focus collimated light from the light guide onto an external detector. Thus, a radius of curvature of any section formed in that side may depend on a position of an image source or a position of a detector relative to the light guide. In the example illustrated in FIG. 4, a suitable radius of curvature of thicker side 30 of refined extrusion 22 may be 631 millimeters.

Figure 5:
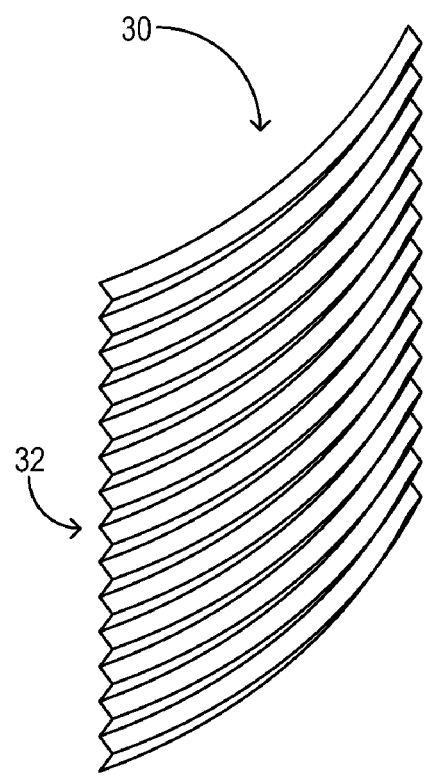
FIG. 5 shows an inset from an example embodiment of a refined extrusion from which a light guide is made, in accordance with the present disclosure.

A detailed sectional view of thicker side 30 in one embodiment is shown in FIG. 5. The drawing shows an array of substantially planar facets 32 running horizontally along the thicker side of refined extrusion 22. The facets may be constructed to form a Fresnel lens on the thicker side of the refined extrusion. In one, non-limiting example, twenty-seven facets may be formed in the thicker side of the extrusion, forming a series of horizontal ridges spaced about 840 microns apart and extending about 80 microns from an upper or lower edge of the thicker side. In other embodiments, the thicker side of the extrusion may have any other suitable shape and/or profile.

A Fresnel lens formed at this location may serve various functions in the display device in which the light guide is to be installed—collimating a focused image passing into the light guide from a projector, for example, or focusing a collimated image from the light guide onto a detector. In other embodiments, an array of substantially planar facets may be disposed on any side of the refined extrusion.

Light rays transmitted through the light guide from a projector or to a detector may undergo numerous internal reflections within the light guide, including reflections from opposing faces 24 and 26. In order for the light rays to transmit an image with a desired high fidelity and without undue loss, the opposing faces may be formed to be highly flat and smooth. In some embodiments, an average roughness of 10 nanometers may be desired; in other embodiments, an average roughness of 2 nanometers may be desired.

By itself, extrusion molding of a thermoplastic polymer may not provide a light guide in which opposing faces 24 and 26 are sufficiently flat and smooth. This is due to potentially unavoidable shrinkage in the extruded polymer, which occurs on cooling in some materials, and to scratching by irregularities in the die. Shrinkage may be an even greater problem for cast polymers prepared from monomers. Injection molding may provide an acceptable result in some cases, but may prove costly for relatively thick monoliths due to the long cooling times for solidification.

Therefore, method 10 continues to 34 and subsequent steps in FIG. 1, where refined extrusion 22 is subject to further processing. At 34, the refined extrusion is placed in a compression mold.

Figure 6:
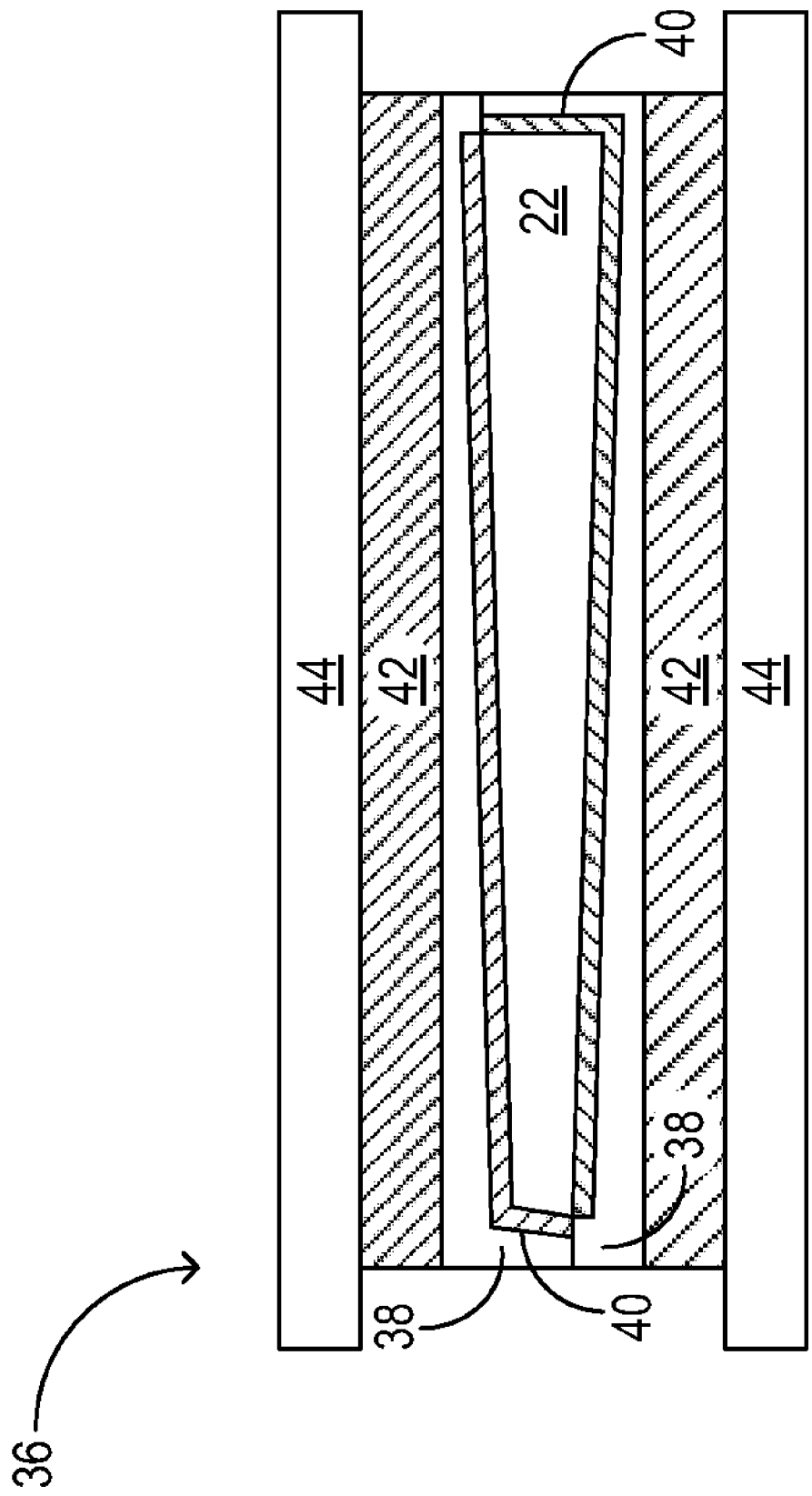
FIG. 6 shows an example embodiment of a surface-layer compression molding apparatus for making a light guide, in accordance with the present disclosure.

FIG. 6 shows in cross section an example surface-layer compression molding apparatus 36, where the refined extrusion is confined on at least four sides by platens 38. The platens shown in the drawing present smooth mold surfaces 40 to the refined extrusion and enclose a void to accommodate the refined extrusion, the void and the quadrilateral opening of extrusion die 14 having one or more dimensions substantially in common.

In some embodiments, mold surfaces 40 may comprise a natively smooth material: mica or float glass, for example. In other embodiments, the mold surfaces may be molded from a thermosetting material which is set in contact with a natively smooth material. In this manner, the mold surfaces presented to the refined extrusion may have an average roughness less than 10 nanometers, and in some embodiments, less than 2 nanometers. In some embodiments, the mold surfaces presented to the refined extrusion may include one or more optically smooth surfaces.

In FIG. 6, platens 38 present a plurality of mold surfaces 40 to refined extrusion 22. In such embodiments, any of the plurality of mold surfaces may be featureless as well as smooth. In one embodiment, for example, the mold surfaces placed in contact with opposing faces 24 and 26 of the refined extrusion may be smooth and featureless.

However, the mold surfaces placed in contact with thinner side 28 and thicker side 30 of the refined extrusion may comprise various features. Specifically, these surfaces may be smooth on a sub-micron scale, but comprise micron-to-millimeter sized features. In one embodiment, the particular mold surface placed in contact with the thicker side of the refined extrusion may comprise features complementary to those of the Fresnel lens to be formed in that face of the light guide. Variants of this embodiment may be contemplated. In a first variant, a refined extrusion having Fresnel lens features as shown in FIG. 5 may be prepared (as described above) and then placed into a compression mold comprising features complementary to those already present in the extrusion. In a second variant, a refined extrusion lacking Fresnel lens features may be prepared and then placed into a compression mold comprising features complementary to those desired in the light guide. In this variant, subsequent surface-layer melting and compression molding (described below) are relied upon for rendering the Fresnel lens features of the light guide.

Mold surfaces 40 may be heated via heating elements integrated in heatable platens 38. The heating elements may be resistive or inductive electrical heating elements, for example. In some embodiments, the platens may also be cooled via a coolant flowing around through the platens or elsewhere in surface-layer compression-molding apparatus 36. To exert pressure on refined extrusion 22, the platens enclosing the refined extrusion may be placed between anvils 42 of hydraulic press 44.

Returning again to FIG. 1, method 10 continues to 46, where one or more mold surfaces 40 is heated substantially to a melting temperature or a softening temperature of the thermoplastic polymer. This action may cause melting of a surface layer of the refined extrusion while at least some of the refined extrusion below the surface layer does not melt. In other embodiments, heating the one or more mold surfaces may cause the surface layer of the refined extrusion to soften but not melt.

Method 10 continues to 48, where pressure is applied to refined extrusion 22 via compression mold 36. Thus, one or more faces of the refined extrusion are maintained in contact with one or more heated mold surfaces to promote continued softening or melting of the surface layer. In one embodiment, pressure may be applied for a predetermined period of time after mold surfaces 40 have reached a set-point temperature. In another embodiment, pressure may be maintained while one or more dimensions of refined extrusion 22 (and/or distances between platens 38) is monitored. Heating and application of pressure may be discontinued when the one or more dimensions of the refined extrusion reaches a fixed value.

Method 10 then continues to 50, where the compression-molded extrusion is cooled. The compression-molded extrusion may be cooled via one or more coolants flowing around or through around surface-layer compression-molding apparatus 36, as described above. In some embodiments, at least some of the pressure exerted on refined extrusion 22 during compression molding may be maintained while the compression-molded extrusion is being cooled.

Method 10 then concludes at 52, where the compression-molded extrusion is ejected from the compression mold.

It will be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Finally, it will be understood that the systems and methods described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

The invention claimed is:

1. A method for making a wedge-shaped light guide, comprising:
   extruding a thermoplastic polymer through a die to form an optically transparent, wedge-shaped extrusion;
   cutting the optically transparent, wedge-shaped extrusion to a fixed-width portion having a thicker side and a thinner side;
   after cutting, machining the thicker side of the fixed-width portion;
   after machining the thicker side of the fixed-width portion, maintaining in contact with a heated mold surface a face of the fixed-width portion extending between the thinner side and the thicker side as machined, to soften or melt a surface layer of the face without melting or softening the thermoplastic polymer beneath the surface layer; and
   while the face of the fixed-width portion is maintained in contact with the heated mold surface, applying pressure to the fixed-width portion to smoothen the face to produce the wedge-shaped light guide.

2. The method of claim 1, wherein the thermoplastic polymer comprises one or more of a polyacrylate, a polyacrylonitrile, a polyamide, and a polycarbonate.

3. The method of claim 1, wherein extruding the thermoplastic polymer through the die comprises forming a wedge-shaped extrusion having a quadrilateral cross-section.

4. The method of claim 1, wherein machining the thicker side of the fixed-width portion includes machining to form a section of a cylinder enclosed by an acute central angle.

5. The method of claim 1, wherein the pressure is applied to the fixed-width portion via a compression mold.

6. The method of claim 5, further comprising cooling the compression mold while applying the pressure to the fixed-width portion.

7. The method of claim 1, wherein the pressure is applied to the fixed-width portion until a dimension of the fixed-width portion reaches a fixed value.

8. The method of claim 1, wherein the face maintained in contact with the heated mold surface is one of a plurality of faces maintained in contact with a corresponding plurality of heated mold surfaces.

9. The method of claim 1, wherein maintaining the face in contact with the heated mold surface comprises maintaining the face in contact with a float glass surface.

10. The method of claim 1, wherein maintaining the face in contact with the heated mold surface comprises maintaining the face in contact with a surface having an average roughness less than two nanometers.

11. The method of claim 4, further comprising forming a Fresnel lens in the thicker side.

12. The method of claim 11, wherein forming the Fresnel lens in the thicker side comprises maintaining the thicker side in contact with a heated mold surface having features complementary to the Fresnel lens.

13. A method for making a wedge-shaped light guide, comprising:
   extruding a thermoplastic polymer through a die to form an optically transparent, wedge-shaped extrusion;
   cutting the optically transparent, wedge-shaped extrusion to a fixed width portion;
   machining a thicker side of the fixed-width portion to form a curvature along the thicker side of the fixed-width portion;
   after such machining, maintaining the thicker side, as machined,
   in contact with a heated mold surface having features complementary to a Fresnel lens to soften or melt a surface layer of the thicker side;
   after such machining, maintaining a face of the fixed-width portion, as machined, in contact with a heated, flat, and optically smooth mold surface to soften or melt a surface layer of the face without melting or softening the thermoplastic polymer beneath the face; and
   while the thicker side and the face are maintained in contact with their corresponding heated mold surfaces, applying pressure to the extrusion to smoothen the thicker side and the face to produce the wedge-shaped light guide.

14. The method of claim 13, wherein maintaining the face in contact with the heated, flat, and optically smooth mold surface comprises maintaining the face in contact with a surface having an average roughness less than 10 nanometers.

15. The method of claim 1, wherein extruding the thermoplastic polymer through the die comprises extruding a material consisting essentially of the thermoplastic polymer.

16. The method of claim 1, wherein the wedge-shaped light guide is more than one-hundred millimeters in width and more than two-hundred millimeters in length.

* * * * *